(12) United States Patent
Borchers et al.

(10) Patent No.: US 8,255,618 B1
(45) Date of Patent: Aug. 28, 2012

(54) PERFORMANCE ISOLATION IN A SHARED MEMORY DEVICE

(75) Inventors: Albert T. Borchers, Santa Cruz, CA (US); Thomas J. Norrie, Mountain View, CA (US); Andrews T. Swing, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/267,613

(22) Filed: Oct. 6, 2011

(51) Int. Cl.
*G06F 13/00* (2006.01)
(52) U.S. Cl. ............... 711/103; 710/6; 710/21; 710/24; 710/28; 710/40
(58) Field of Classification Search .................. None
See application file for complete search history.

(56) References Cited

U.S. PATENT DOCUMENTS 6,301,639 B1 * 10/2001 Cleavinger et al. .......... 711/112
6,345,324 B1 * 2/2002 Baskey et al. ................. 710/52
8,055,816 B2 * 11/2011 Asnaashari et al. ........... 710/39

* cited by examiner

*Primary Examiner* — Hetul Patel
(74) *Attorney, Agent, or Firm* — Brake Hughes Bellermann LLP

(57) ABSTRACT

Shared memory device apparatus and related methods are disclosed. An example method includes obtaining memory operation commands. The memory operation commands are received by a command dispatcher in a same order as obtained by the queue arbiter from the host device. The example method further includes separately and respectively queuing the memory operation commands for each of a plurality of memory devices and dispatching the memory operation commands for execution. The example method also includes receiving the dispatched memory operation commands at a plurality of command queues, where each command queue is associated with a respective one of the plurality of memory devices. Each command queue is configured to receive its respective dispatched memory operation commands from the command dispatcher in a same order as received by the dispatcher and provide the received memory operation commands to its respective memory device in a first-in-first-out order.

22 Claims, 9 Drawing Sheets

EXAMPLE
COMMAND SLOT ALLOCATIONS
(1000 TOTAL SLOTS)

| PARTITION_A ALLOCATION | PARTITION_B ALLOCATION | PARTITION_C ALLOCATION | PARTITION_A GUARANTEE | PARTITION_B GUARANTEE | PARTITION_C GUARANTEE | SHARED |
|---|---|---|---|---|---|---|
| 50% | 25% | 25% | 500 | 250 | 250 | 0 |
| 600 | 300 | 100 | 600 | 300 | 100 | 0 |
| 700 | 300 | 300 | 500 | 100 | 100 | 300 |

PERFORMANCE ISOLATION IN A SHARED MEMORY DEVICE

TECHNICAL FIELD

This document relates, generally, to performance isolation in a shared memory device.

SUMMARY

In a general aspect, a memory controller for controlling operation of a data storage device includes a queue arbiter configured to obtain, from a host device, memory operation commands for execution by the data storage device. The memory controller further includes a command dispatcher operationally coupled with the queue arbiter. The command dispatcher is configured to receive the memory operation commands from the queue arbiter in a same order as obtained by the queue arbiter from the host device, separately and respectively queue the memory operation commands for each of a plurality of memory devices and dispatch the memory operation commands for execution by the plurality of memory devices. The memory controller further includes a plurality of command queues operationally coupled with the command dispatcher, where each command queue is associated with a respective one of the plurality of memory devices. Each command queue is configured to receive the dispatched memory operation commands corresponding with its respective memory device from the command dispatcher in a same order as received by the command dispatcher and provide the received memory operation commands to its respective memory device in a first-in-first-out order.

Implementations may include one or more of the following features. For example, the memory controller may include a decoder that is configured to respectively determine which of the plurality of memory devices corresponds with each of the memory operation commands. Respectively determining which of the plurality of memory devices corresponds with each of the memory operation commands may include performing address translation on a respective memory address included in each of the memory operation commands.

The host device may be one of a personal computer, a laptop computer, a server, a tablet computer and a netbook computer.

The memory operation commands may include one or more of flash memory read operations, flash memory write operations and flash memory erase operations.

The queue arbiter may be further configured to obtain the memory operation commands from the host device based on a work schedule for a plurality of memory partitions implemented in the data storage device. The command dispatcher may include a unified command buffer including a plurality of memory operation command slots and the work schedule may be based on respective allocations of the plurality of memory operation command slots to each of the plurality of memory partitions. The work schedule may be based on respective priorities of each of the memory partitions. Each command queue of the plurality of command queues may be associated with a single one of the memory partitions.

The queue arbiter may be configured, for each memory partition, to obtain memory operation commands based on availability of allocated memory operation command slots for the respective memory partition. The respective allocations may include guaranteed memory operation command slot allocations for each of the plurality of memory partitions. The command dispatcher may be configured to provide for oversubscription of the memory operation command slots, such that a number of the memory operation command slots corresponding with the oversubscription are shared by the plurality of memory partitions.

The queue arbiter may be configured, for a given memory partition, to obtain memory operation commands for the given memory partition from one or more partition queues on the host device that correspond with the given memory partition. The queue arbiter may be configured to obtain memory operation commands for memory partitions having a plurality of corresponding partition queues in the host device in accordance with respective priorities for each queue of the respective plurality of partition queues.

The command dispatcher may be configured to separately and respectively queue memory operation commands by maintaining, for each of the plurality of memory devices, a respective linked list of corresponding memory operation commands in the command dispatcher. The command dispatcher may be configured, for each command queue, to dispatch respective memory operations based on availability of queue slots in the respective command queue.

In another general aspect, a method includes obtaining, from a host device by a queue arbiter of a memory controller, memory operation commands for execution by a data storage device. The method further includes receiving, by a command dispatcher of the memory controller, the memory operation commands from the queue arbiter in a same order as obtained by the queue arbiter from the host device. The method still further includes separately and respectively queuing, in the command dispatcher, the memory operation commands for each of a plurality of memory devices. The method also includes dispatching, by the command dispatcher, the memory operation commands for execution by the plurality of memory devices and receiving, by a plurality of command queues, the dispatched memory operation commands. Each command queue of the plurality of command queues is associated with a respective one of the plurality of memory devices. Each command queue is configured to receive the dispatched memory operation commands corresponding with its respective memory device from the command dispatcher in a same order as received by the command dispatcher and provide the received memory operation commands to its respective memory device in a first-in-first-out order.

Implementations may include one or more of the following features. For example, the method may include respectively determining which of the plurality of memory devices corresponds with each of the memory operation commands by performing address translation on a respective memory address included in each of the memory operation commands.

In another general aspect, a system includes a host device comprising a plurality of host memory operation queues and a data storage device operationally coupled with the host device. The data storage device includes a plurality of flash memory devices and a memory controller operationally coupled with the plurality of flash memory devices. The memory controller includes a queue arbiter configured to obtain, from the host memory operation queues, memory operation commands for execution by the data storage device and a command dispatcher operationally coupled with the queue arbiter. The command dispatcher is configured to receive the memory operation commands from the queue arbiter in a same order as obtained by the queue arbiter from the host device, separately and respectively queue the memory operation commands for each of the plurality of flash memory devices and dispatch the memory operation commands for execution by the plurality of flash memory devices. The memory controller also includes a plurality of memory device command queues operationally coupled with the command dispatcher. Each memory device command queue is associated with a respective one of the plurality of flash memory devices. Each memory device command queue is configured to receive the dispatched memory operation commands corresponding with its respective memory device from the command dispatcher in a same order as received by the command dispatcher and provide the received memory operation commands to its respective flash memory device in a first-in-first-out order.

Implementations may include one or more of the following features. For example, the data storage device may implement a plurality of memory partitions and each of the host memory operation queues may be associated with a single memory partition of the plurality of memory partitions. The queue arbiter may be configured to obtain memory operation commands from the host device, for each memory partition, based on respective priorities of the host memory operation queues of the respective memory partition. Each of the flash memory devices may be associated with a single memory partition of the plurality of memory partitions.

DETAILED DESCRIPTION

Figure 1:
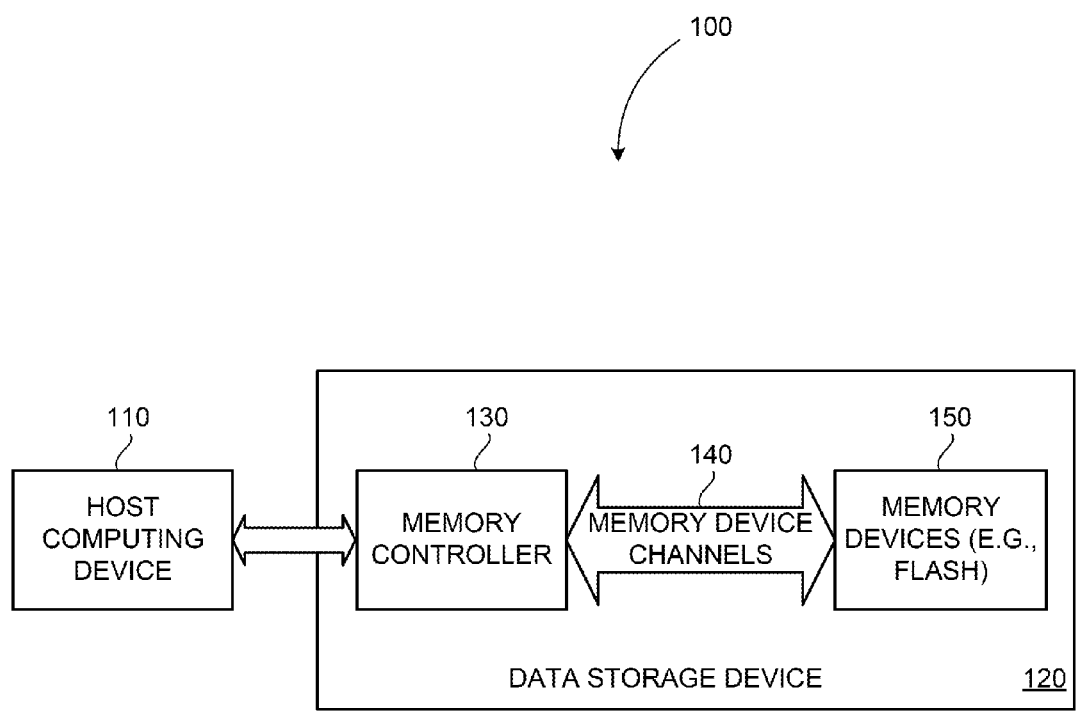
FIG. 1 is a block diagram illustrating a computing system in accordance with an example embodiment.

FIG. 1 is a block diagram illustrating a computing system 100 in accordance with an example embodiment. The computing system 100 includes a host computing device 110 and a data storage device 120. The host computing device 110 and the data storage device 120 may be implemented using the techniques described herein. The host 110, in this example may be an electronic device that is operably coupled with the data storage device 120, and may issue various types of commands and/or requests to the data storage device. The host 110 may take a number of forms. As some examples, the host 110 may be implemented as a personal computer, a laptop computer, a server, a tablet computer or a netbook computer. In other embodiments, the host 110 may take other forms as well. The data storage device 120 may also take a number of forms. The data storage device 120 may be implemented as a number of appropriate devices that may work in conjunction with a host device (e.g., the host device 110) to store and/or retrieve electronic data. For instance, the data storage device may be solid state drive (SSD) (e.g., a flash memory based SSD), a magnetic disk drive or an optical disk drive, as some examples.

As shown in FIG. 1, the data storage device 120 includes a memory controller 130, memory device channel interfaces 140 and memory devices 150. The memory devices 150 may be implemented using a number of different types of memory devices. For instance, the memory devices 150 may be implemented using flash memory devices, or other types of non-volatile memory devices. In certain embodiments, volatile memory devices, such as random access memory devices, may be used. For purposes of this disclosure, the various embodiments described herein will be principally discussed as being implemented using flash memory devices. It will be appreciated, however, that other approaches are possible and other types of memory devices may be used to implement the embodiments described herein.

In the computing system 100, as well as in other embodiments described herein, the memory controller 130 may obtain memory operation commands from the host computing device 110. When implementing the data storage device 120 using flash memory devices for the memory devices 150, the memory operation commands obtained by the memory controller 130 from the host computing device 110 may include flash memory read commands, flash memory write commands and flash memory erase commands, as well as other types of flash memory commands (e.g., move commands and/or copy commands). For purposes of this disclosure, the terms memory operation command, memory operation and memory command may be used interchangeably to describe machine-readable instructions (e.g., from a host computing device to a data storage device) to execute one or more data storage functions in a data storage device.

In the computing system 100, the memory devices 150 may include a plurality of memory devices, such as flash memory devices, that are organized into a plurality of memory channels. In such an approach, each of the memory channels may include one or more individual memory devices. Depending on the particular embodiment, the individual memory devices of a given memory channel may be implemented in individual device packages, or alternatively, multiple memory devices of a given memory channel may be included in a single device package.

For instance, in an example embodiment, the data storage device 120 may include multiple memory channels, where each memory channel includes twenty flash memory devices 150 that are implemented in five separate device packages (e.g., four flash memory devices per package). In such an approach, the memory controller 130 may communicate with the memory devices 150 of each memory channel using a separate memory device channel interface 140. Each memory device channel interface 140 may include a respective channel controller that is configured to facilitate communication between the memory devices 150 of the respective memory channel and the memory controller 130. For example, such channel controllers may be configured to manage a shared bus between the memory controller 130 and the memory devices 150 of a given memory channel, including communicating memory operation commands, chip select information, as well as managing communication of other data and control information between the memory controller 130 and the memory devices 150 over a corresponding memory device channel interface 140.

Figure 2:
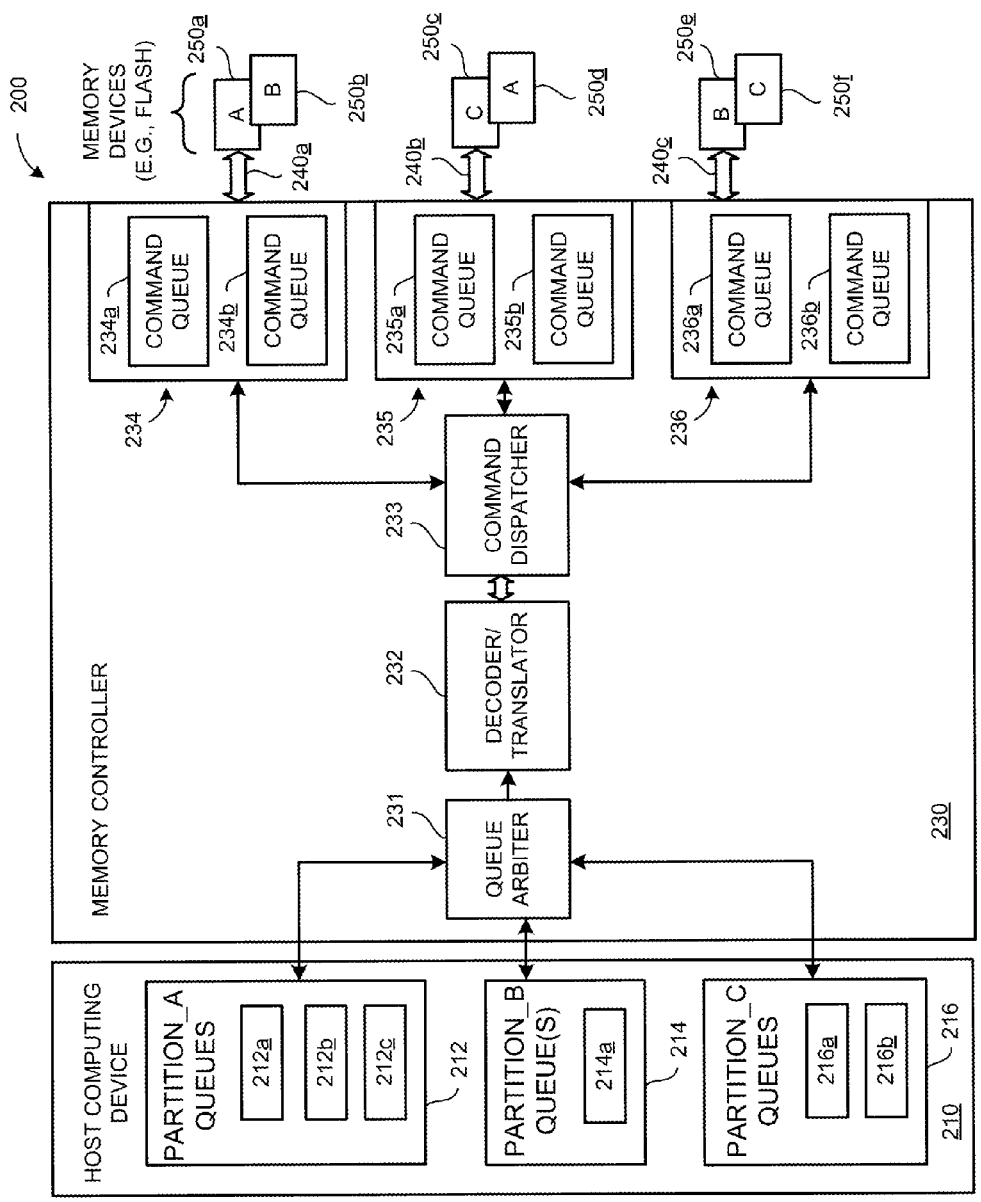
FIG. 2 is a block diagram illustrating another computing system in accordance with an example embodiment.

FIG. 2 is a block diagram illustrating a computing system 200 in accordance with another example embodiment. The computing system 200 shown in FIG. 2 includes similar elements to the computing system 100 shown in FIG. 1. Like elements of the computing system 200 to those of the computing system 100 are referenced with 200 series reference numerals that correspond with the 100 series reference numerals shown in FIG. 1. For instance, the computing system 200 includes a host computing device 210, a memory controller 230, memory device communication channels 240 (240a-240c) and memory devices 250 (250a-250f).

The various elements of the computing system 200 shown in FIG. 2 (as well as the other embodiments described herein) are provided by way of illustration. The computing system 200 (and the other embodiments described herein) may include other elements or aspects. For instance, the computing system 200, may include data path elements configured to communicate data between the host device 210 and the memory controller 230 and/or the memory devices 250a-250f. Such data path components may include, for example, one or more bus interfaces and/or a direct memory access (DMA) controller, as well as a number of other possible components. Further, the computing system 200 may also include additional control path elements other than those shown in FIG. 2. It will be appreciated that the particular components and/or aspects of the computing system 200, as well as the other embodiments described herein, will depend, at least in part, on the particular embodiment.

In the computing system 200, the host computing device 210, the memory controller 230, the memory device channels 240 and the memory devices 250 may be configured to implement a plurality of memory partitions. In the embodiment shown in FIG. 2, three memory partitions are implemented, PARTITION_A, PARTITION_B and PARTITION_C. In other embodiments, additional or fewer partitions may be implemented.

As shown in FIG. 2 the host computing device 210 includes one or more queues (which may be referred to as host memory operation queues or partition queues) that are associated with each memory partition implemented in the computing system 200. For example, the host computing device 210 includes PARTITION_A Queues 212, PARTITION_B Queues 214 and PARTITION_C Queues 216. In the host computing device 210, the PARTITION_A Queues 212 includes a queue 212a, a queue 212b and a queue 212c; the PARTITION_B Queues 214 includes only a single queue 214a; and the PARTITION_C Queues 216 includes a queue 216a and a queue 216b. In other embodiments, additional or fewer queues may be used for each memory partition. In the computing system 200, the memory partition queues 212-216 may be used to queue memory operation commands generated by the host computing device 210 that are waiting to be communicated to the memory controller 230 for execution by the memory devices 250.

In the computing system 200, the host computing device 210 may be configured to assign priorities to the individual host memory operation queues for memory partitions that have more than one queue associated with them. For instance, for the PARTITION_A Queues 212, the queue 212a may be a high priority queue, the queue 212b may be a medium priority queue and the queue 212c may be a low priority queue. In order to implement such priorities, the host computing device 210 may assign weights to the individual queues. The PARTITION_A Queues 212 may then be sampled (by the memory controller 230 to obtain memory operations) in accordance with a work schedule that is based on the respective weights assigned to each queue. For example, if the queue 212a is assigned a weight of "6", the queue 212b is assigned a weight of '3' and the queue 212c is assigned a weight of '1', the corresponding work schedule would result in memory commands for PARTITION_A being obtained (by the memory controller 230) from the queue 212a twice as frequently as from the queue 212b and six times as frequently as from the queue 212c. Similarly, memory commands would be obtained (by the memory controller 230) from the queue 212b three times as frequently as from the queue 212c.

In addition to the relative priorities between individual host memory operation queues that are associated with a given memory partition, the memory controller 230 may sample the separate partition queue groups 212-216 based on a memory partition work-schedule, where the memory partition work schedule is based on relative priorities of the memory partitions with respect to one another. For example, the relative priorities between partitions may be determined based on command buffer slot allocations for each partition in the memory controller 230. Such an approach is discussed in further detail below with respect to FIGS. 3 and 4. Briefly, in such an approach, the groups of partition queues may be sampled based on a first set of relative priorities between the memory partitions (e.g., based on a memory partition work schedule), while the individual queues within a given group of partition queues may be sampled based on a second set of relative priorities between the individual queues (e.g., based on a partition queue work schedule). It will be appreciated that the memory partition work schedule and the queue partition work scheduled may be implemented using a number of appropriate techniques, such as round robin, weighted round robin or other work scheduling techniques. Using such an approach, performance for each memory partition may be isolated from the other partitions, where guaranteed resources (e.g., memory command slots) may be allocated to each memory partition.

As shown in FIG. 2, the memory controller 230 of the computing system 200 includes a queue arbiter 231, a decoder/translator 232, a command dispatcher 233, command queue groups 234, 235 and 236, memory device channel interfaces 240a-240c and flash memory devices 250a-250f. As shown in FIG. 2, each memory device 250a-250f is associated with one of the three memory partitions of the computing system 200 (A, B or C, as indicated in FIG. 2). The particular arrangement shown in FIG. 2 is given by way of example and other arrangements are possible. For instance, the distribution of the memory devices across the memory partitions may be weighted. For example, four of the memory devices 250a-250f could be assigned to PARTITION_A, while only a single one of the memory devices 250a-250f may be respectively assigned to each of PARTITION_B and PARTITION_C. Of course, the computing system 200 may include additional or fewer memory devices and may also implement additional or fewer memory partitions, where the memory partitions may then be implemented in a number of different arrangements, such as using the techniques described herein.

As indicated above, in the computing system 200, the queue arbiter 231 of the memory controller 220 may be configured to obtain, from the host device 210, memory operation commands for execution by the memory devices in a number of fashions. For example, in one embodiment, the queue arbiter 231 may be configured to obtain the memory operation commands from the host device in accordance with a partition work schedule for a plurality of memory partitions implemented in the data storage device, such as using the techniques described herein. In one embodiment, such a partition work schedule may be based on availability of allocated memory operation command slots for each respective memory partition. Such an approach is discussed in further detail below with respect to FIGS. 3 and 4.

In the computing system 200, the queue arbiter 231 may be further configured, for a given memory partition, to obtain memory operation commands for the given memory partition (e.g., A, B or C) from one or more partition queues on the host device 210 that correspond with the given memory partition (respectively 212, 214 and 216) in accordance with such a partition work schedule. Further, the queue arbiter 231 may be still further configured to obtain memory operation commands for memory partitions having a plurality of corresponding partition queues in the host device 230 in accordance with respective priorities for each queue of the respective plurality of partition queues (e.g., in accordance with a partition queue work schedule).

In the computing system 200, the decoder/translator 232 may be configured to respectively determine which of the plurality of memory devices 250 corresponds with each of the memory operation commands. For instance, the decoder/translator 232 may be configured to perform logical to physical address translation on a respective memory address included in each of the memory operation commands that are obtained from the host computing device 210. Once the physical memory address is determined, the corresponding memory device 250 can be determined from the physical address. In other embodiments, address translation may be performed by the host device 210. In such an approach, the decoder/translator 232 could be eliminated, and the queue arbiter 231 may be directly coupled with the command dispatcher 233. In other embodiment, the decoder/translator 232 may perform additional functions, such as decoding received memory commands into respective sub-commands. It will be appreciated that the memory partition associated with each memory command is known when the command is obtained from the host computing device 210, as the host memory operation queues 212-214 are organized by partition.

The command dispatcher 233 of the computing system 200 may be operationally coupled with the queue arbiter 231 (e.g., via the decoder/translator 232 or directly), where the command dispatcher 233 is configured to receive the memory operation commands from the queue arbiter 231 (or sets of sub-commands for those memory operations commands) in a same order as obtained by the queue arbiter 231 from the host device 210. The command dispatcher 233 may be further configured to separately and respectively queue the memory operation commands for each of a plurality of memory devices 250. An example approach for queuing memory operation commands that may be implemented in the command dispatcher 233 is described in further detail below with respect to FIG. 3.

In the computing system 200, the command dispatcher 233 may be further configured to dispatch the memory commands to their respective command queues 234-236, such as based on a physical memory address determined by the decoder/translator 232. In the computing system 200, the command dispatcher 233 may be configured to dispatch respective memory operations for a given memory device 250 based on availability of queue slots in a respective command queue of the command queues 234-236.

The memory controller 230 of the computing system 200 shown in FIG. 2 includes groups of command queues 234, 235 and 236 (or memory device command queues) that are operationally coupled with the command dispatcher 233. In the computing system 200, each command queue group 234, 235 and 236 corresponds with a respective memory channel, such as described herein. Further, each command queue group 234, 235 and 236 includes individual command queues that each respectively correspond with a memory device of their respective memory channel. As an example, the command queue group 234 (which includes a command queue 234a and a command queue 234b.) is operationally coupled with the memory device channel interface 240a. The memory device channel interface 240a is, in turn, operationally coupled with the memory devices 250a and 250b. The command queues 234a and 234b are associated, respectively, with the memory devices 250a and 250b. In such an arrangement, the memory device 250a would receive memory operation commands from the command queue 234a, while the memory device 250b would receive memory operation commands from the command queue 234b. The command queue groups 235 and 236 (and their command queues 235a, 235b, 236a and 236b) correspond with memory device channel interfaces 240b and 240c, and memory devices 250c, 250d, 250e and 250f in similar fashion as discussed above for the command queue group 234, the memory device channel interface 240a, and the memory devices 250a and 250b.

In the computing system 200, each of the command queues 234a-236b may be configured to receive the dispatched memory operation commands corresponding with its respective memory device 250a-250f from the command dispatcher 233 in a same order as received by the command dispatcher 233 from the queue arbiter. The commands queues 234a-236b may each be further configured to provide the received memory operation commands to their respective memory devices 250a-250f in a first-in-first-out order. Also, in the computing system 200, in embodiments where each of the memory devices 250a-250f is associated with a respective memory partition, the command queues 234a-236b would likewise be associated with the same memory partition as their corresponding memory device.

Figure 3:
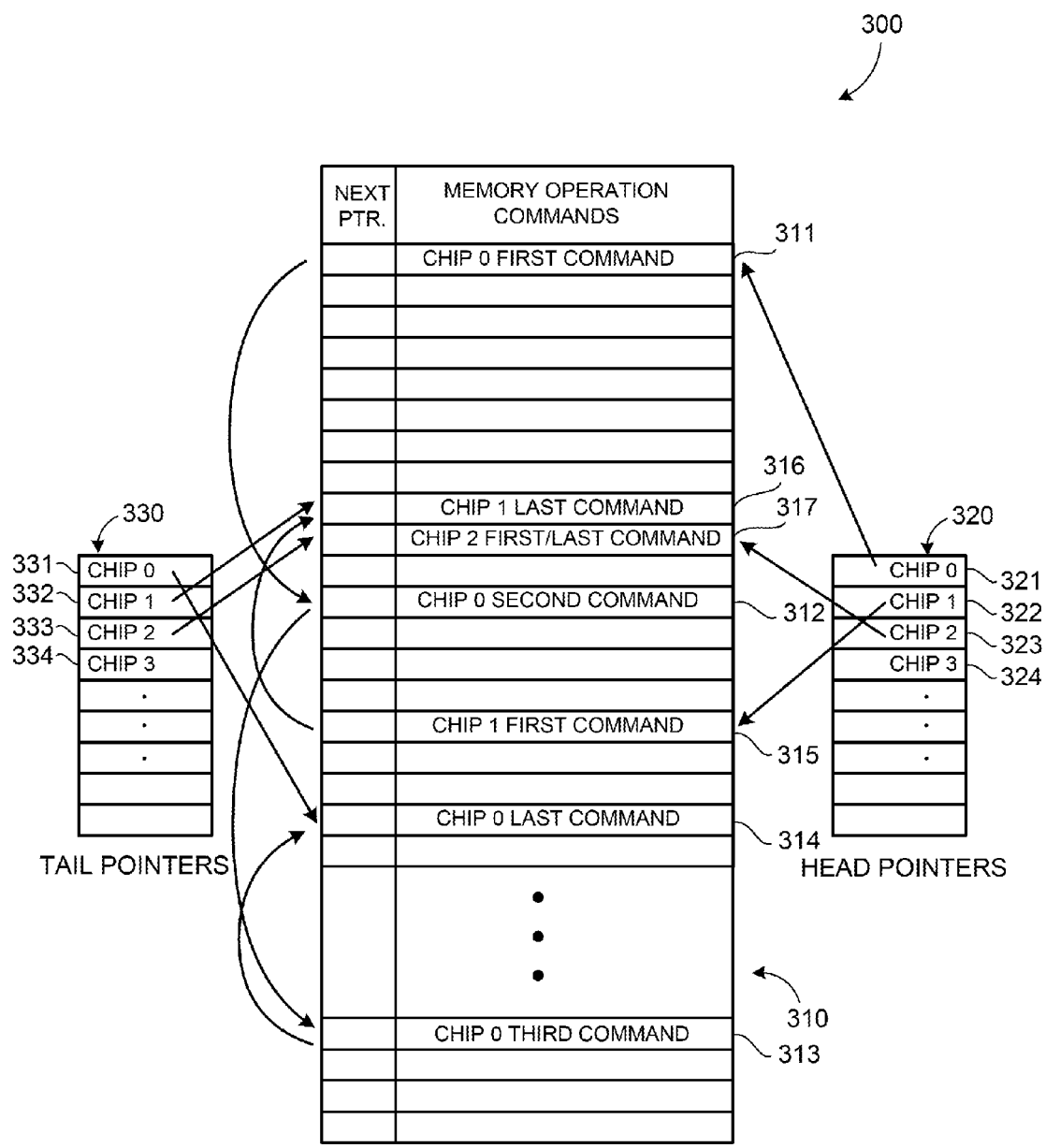
FIG. 3 is a block diagram illustrating a command dispatch buffer in accordance with an example embodiment.

FIG. 3 is a block diagram illustrating a command dispatch buffer 300 in accordance with an example embodiment. The command dispatch buffer 300 may be included, for example, in the command dispatcher 233 illustrated in FIG. 2 and discussed above. Accordingly, for purposes of illustration, the command dispatch buffer 300 will be described with further reference to FIG. 2. It will be appreciated, however, that the command dispatcher 233 may dispatch memory commands for execution using a number of other appropriate techniques.

The command dispatch buffer 300 may be used, in the computing system 200, to separately and respectively queue memory operation commands (e.g., received from the queue arbiter 231) for each of the memory devices 250a-250f. As shown in FIG. 3, the command dispatch buffer 300 includes a unified command buffer 310, an index of head pointers 320 and an index of tail pointers 330. Using the index of head pointers 320, the index of tail pointers 330 and next command pointer fields that are included in each command slot of the unified command buffer 310, the command dispatch buffer 300 may keep track of (e.g., separately and respectively queue) the memory operation commands for each of the memory devices 250a-250f using respective linked lists. In such an approach, the unified command buffer 310 may be configured to store memory operation commands for all of the memory devices 250a-250f, where the command buffer 300 keeps track of respective memory commands for each of the memory devices 250a-250f using the respective linked lists.

Figure 4:
FIG. 4 is a table illustrating command buffer slot allocations in accordance with example embodiments.

In an example embodiment, where the command buffer 300 is implemented in the command dispatcher 233 of the memory controller 230, a memory partition work schedule may be determined based on respective allocations of the plurality of memory operation command slots to each of the plurality of memory partitions. Examples of such allocations are illustrated in FIG. 4. In such an approach, each time the queue arbiter 231 (in accordance with the partition work schedule) obtains a memory operation command for a given memory partition from the host computing device 210, the command buffer 300 may reduce a count of available commands slots for the given memory partition in the unified buffer 310 by one. When a memory command for the given memory partition is completed, the command buffer 300 may increase the count of available command slots in the unified buffer 210 for the given partition by one. If all the command slots in the unified buffer 310 that are allocated to the given memory partition (including any shared command slots) become occupied (are holding pending commands), the queue arbiter 231 may be configured to stop obtaining memory operation commands from the host computing device 210 for the given memory partition until at least one of the occupied command slots becomes available.

As indicated above, the command dispatch buffer 300 shown in FIG. 3 may be used to separately and respectively queue memory operation commands for each of a plurality of memory devices, such as the memory devices 250a-250f in a unified command buffer 310. By way of example, the embodiment shown in FIG. 3 illustrates the use of linked lists for separately and respectively queuing memory operation commands for four memory devices, designated 'Chip 0', Chip '1', 'Chip 2' and 'Chip 3'. It will be appreciated that the approach illustrated in FIG. 3 may be used to keep track of memory operation commands for the memory devices 250a-250f in like fashion.

In the command dispatch buffer 300, the linked list of memory operation commands for Chip 0 includes four commands. The head pointer 321 for Chip 0 points to the first memory command available for dispatch to a corresponding command queue for Chip 0, which is stored in memory operation command slot (command slot) 311. In like fashion as discussed above, the command slot 311 includes a next pointer, which, as shown in FIG. 3, points to command slot 312, which includes the second command available in the command buffer 300 for dispatch to the command queue for Chip 0. The next pointer of the command slot 312 points to command slot 313, which includes the third command available in the command buffer 300 for dispatch to the command queue for Chip 0. The next pointer of the command slot 313 points to command slot 314, which includes the fourth, and last, command available in the command dispatch buffer 300 for dispatch to a command queue for Chip 0. As shown in FIG. 3, the tail pointer 331 for Chip 0 also points to the command slot 314, as command slot 314 is, in this illustration, the tail of a linked list for memory commands awaiting dispatch to Chip 0. The next pointer of the command slot 314 may be set to a null value, so as to indicate that there is not currently a next command (after the command in slot 314) for the linked list of memory commands for Chip 0.

In such an approach, when a memory command for a given memory device (e.g., Chip 0) is dispatched from, or received at the unified command buffer 310, the command dispatch buffer 300 may be configured to update the corresponding head pointer, tail pointer and next pointer(s) for the linked list corresponding with the given memory device, as appropriate. As an example, if a new memory command for Chip 0 is received by the command dispatch buffer, the received command may be stored in an available command slot (e.g., for a memory partition associated with the received memory command), the tail pointer 331 may be updated to point to the slot where the new memory command is stored and the next pointer for the command slot 314 may also be updated to point to the command slot where the new command is stored.

Alternatively, if the command in command slot 311 (the first command) is dispatched (e.g., in response to availability in a command queue associated with Chip 0), the command dispatch buffer 300 may simply update the head pointer 321 to point to the memory command in command slot 312. The next pointers and tail pointer 331 for the Chip 0 linked list would not need to be updated in this situation.

The linked lists for Chip 1 and Chip 2 in FIG. 3 may be utilized in similar fashion. The linked list for Chip 1 includes only two commands, a first command in slot 315 and a second command in slot 316. For the linked list for Chip 1, a head pointer 322 points to the first command in slot 315, the next pointer of the slot 315 points to the second command in slot 316, and the tail pointer 332 also points to the second (and last command) of the linked list for Chip 1 in slot 316.

As shown in FIG. 3, the linked list for Chip 2 includes only a single command, which is stored in slot 317. In this situation, the head pointer 323 for the linked list for Chip 2 and the tail pointer 333 both point to the single command in slot 317. As there is only a single command (e.g., no next command) in the linked list for Chip 2 (slot 317), the next pointer field of command slot 317 would be set to a null value, so as to indicate that there is no next command. The pointers for the linked lists for Chips 1 and 2 may be updated in similar fashion as was discussed above with respect to the linked list for Chip 0.

The command dispatch buffer 300 also illustrates a head pointer 324 and a tail pointer 334 for implementing a linked list for Chip 3. However, as shown in FIG. 3, there are no memory commands stored in the unified command buffer for Chip 3. Accordingly, in this situation, the head pointer 324 and the tail pointer 334 would be set to null values to indicate that the linked list is empty. When a memory command for Chip 3 is received at the command dispatcher 233, the command dispatch buffer 300 may store the received command in an available command slot (e.g., for a memory partition associated with the received memory command), and the head pointer 325 and the tail pointer 334 may be initialized to point to the slot where the new memory command is stored.

If additional commands are then received for Chip 3, the head pointer 324, the tail pointer 334 and the next pointer(s) of command slots used to implement the linked list of memory commands for Chip 3 may be updated using the techniques described herein. Also, if the command dispatch buffer 300 dispatches all the commands of a linked list for a given memory device, the command buffer 300 would, in that situation, be configured to set the head pointer and tail pointer for a corresponding linked list to null values, so as to indicate the linked list as being empty.

FIG. 4 is a table 400 illustrating command dispatch buffer command slot allocations in accordance with example embodiments. The allocations illustrated in the table 400 may be used, e.g., by the command dispatch buffer 300, to allocate memory command slots in the unified command buffer 310 to memory partitions that are implemented in a computing system, such as those discussed above with respect to FIG. 2.

As indicated in FIG. 4, the example allocations are based on a unified command buffer 310 with one-thousand total command slots. The table 400 illustrates three examples of allocating the one-thousand total command slots to three memory partitions, PARTITION_A, PARTITION_B and PARTITION_C. In the first example (shown in the first row), PARTITION_A is allocated fifty percent of the available command slots, while PARTITION_B and PARTITION_C are each allocated twenty-five percent of the available command slots. Accordingly, in this example, PARTITION_A would have five-hundred command slots allocated to it, while PARTITION_B and PARTITION_C would each have two-hundred fifty command slots allocated to it. In the second example (shown in the second row) of the table 410, PARTITION_A is allocated and guaranteed six-hundred command slots, PARTITION_B is allocated and guaranteed three-hundred command slots, and PARTITION_C is allocated and guaranteed one-hundred command slots. In both the first example and second example of table 410, there are no command slots that are shared between the three memory partitions.

In certain embodiments, the available command slots of the unified command buffer 310 may be oversubscribed. Such oversubscription of the unified command buffer may occur when the number of command slots allocated to memory partitions implemented in a corresponding computing system, such as the computing system 200, exceeds the number of available command slots.

The third example (shown in the third row) in the table 410 illustrates an example of oversubscription, where PARTITION_A is allocated seven-hundred command slots, while PARTITION_B and PARTITION_C are each allocated three-hundred command slots. In this example, the total number of command slots that have been allocated is one-thousand three-hundred, which is three-hundred more than the number of command slots available, thus the unified buffer would be oversubscribed. In this situation, the command dispatch buffer may provide each memory partition with a guaranteed number commands slots that is lower that its original allocation, while the a number of command slots that is equal to the amount of oversubscription are shared between the partitions (e.g., based on a work sharing algorithm).

In the third example of the table 410, PARTITION_A is guaranteed five-hundred command slots, PARTITION_B and PARTITION_C are each guaranteed one-hundred command slots, while three-hundred command slots are shared between the memory partitions. In other embodiments, command slots in an oversubscription situation may be guaranteed and shared in different manners. For instance, one or more partitions may be allocated a guaranteed number of command slots, while other partitions only have access to a pool of shared command slots. In other embodiments, different partitions may have access to different numbers of shared command slots. The particular approach used for allocating and/or sharing command slots will depend, at least in part, on the particular implementation.

Figure 5:
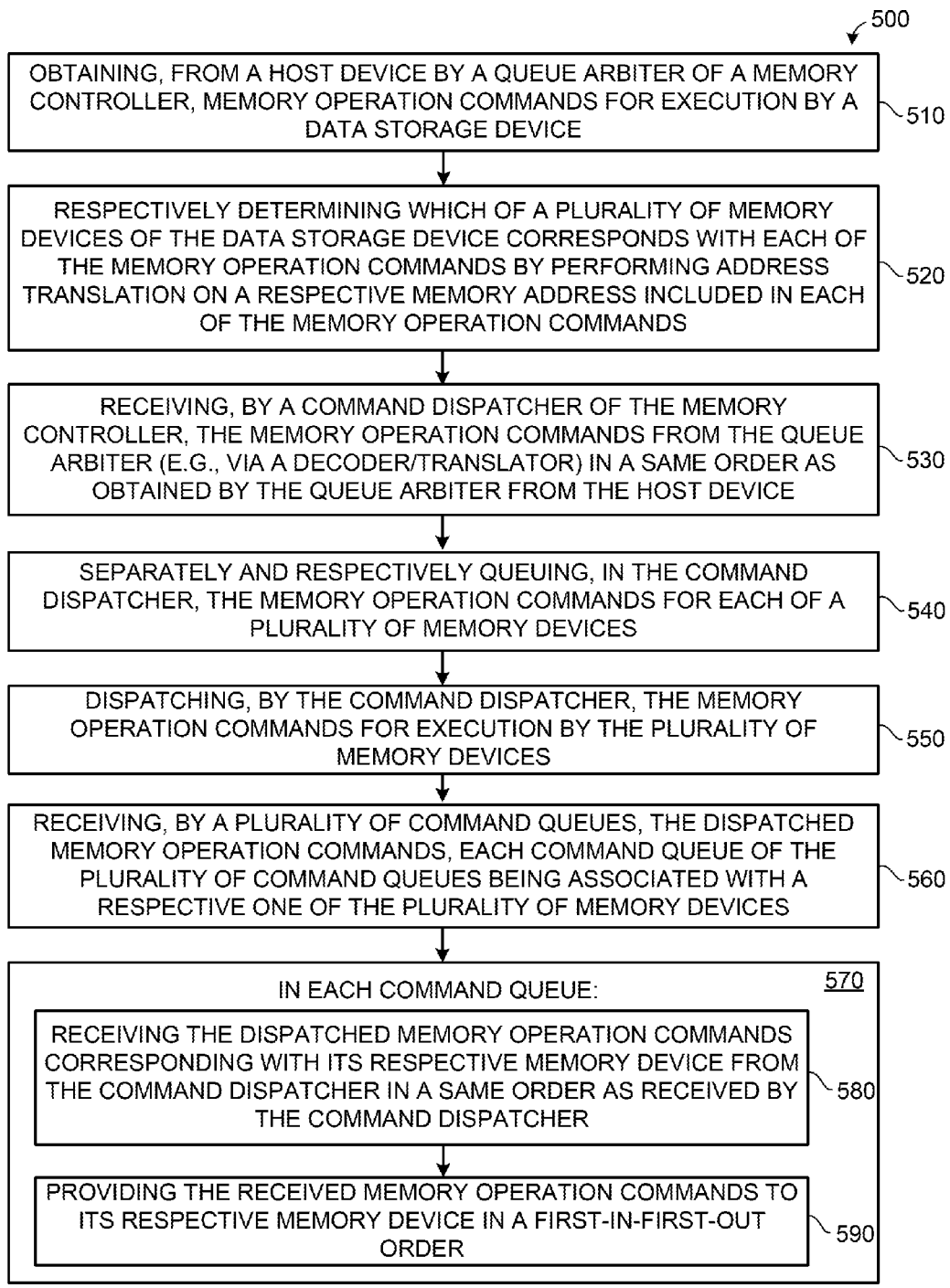
FIG. 5 is a flowchart illustrating a method for processing memory operation commands in accordance with an example embodiment.

FIG. 5 is a flowchart illustrating a method 500 for processing memory operation commands in accordance with an example embodiment. The method 500 may be implemented using the apparatus shown in FIGS. 1-3 and command slot allocation techniques, such as those described with respect to FIG. 4. Accordingly, for purpose of illustration, the method 500 will be described with further reference to FIGS. 1-4, as appropriate. It will be appreciated, however, that the method 500 may be implemented using other appropriate apparatus and techniques.

When implemented using the computing system 200 shown in FIG. 2, the method 500 includes, at block 510, obtaining, from the host device 210 by the queue arbiter 231 of the memory controller 230, memory operation commands for execution by a data storage device. The memory operation commands obtained from the host device 210 may include flash memory commands, such as those described herein. At block 520, the method 500 includes respectively determining (e.g., by the decoder/translator 232), which of the plurality of memory devices 250 corresponds with each of the memory operation commands. As discussed above, the decoder/translator 232 may determine which of the memory devices 250 corresponds with a given memory operation command by performing address translation (e.g., logical to physical address translation) on a respective memory (logical) address that is included in the given memory operation command. In other embodiments, such address translation may be performed by the host computing device 210. In such approaches, the operation at block 520 may be eliminated.

At block 530, the method 500 includes receiving, by the command dispatcher 233 of the memory controller 230, the memory operation commands from the queue arbiter 231 in a same order as obtained by the queue arbiter 231 from the host device 210. The memory operation commands may be received at the command dispatcher 233 via the decoder/translator 233 or, in embodiments where address translation is performed by the host computing device 210, directly from the queue arbiter 231. At block 540, the method 500 includes, separately and respectively queuing, in the command dispatcher 244, the memory operation commands for each of the plurality of memory devices 250. The command dispatcher 233 may perform the queuing at block 540 using the command buffer 310 and linked list approach illustrated in FIG. 3, as discussed above.

At block 550, the method 500 includes dispatching, by the command dispatcher 233, the memory operation commands for execution by the plurality of memory devices 250. In this example, the command dispatcher 233, at block 550, may dispatch the memory operation commands, respectively, to the command queues 234a-236b that correspond with each memory operation (e.g., as determined at block 520). The method 500 further includes, at block 560, receiving, by the plurality of command queues 234a-236b, the dispatched memory operation commands. As was discussed above, each command queue 234a-236b of the plurality of command queues may be associated, respectively, with one of the plurality of memory devices 250.

As illustrated in FIG. 5, the method 500 includes, at block 570, operations 580 and 590 that may be performed by each of the plurality of command queues 234a-236h. At block 580, the method 500 includes, for a given command queue 234a-236b, receiving the dispatched memory operation commands corresponding with its respective memory device 250 from the command dispatcher 233 in a same order as received by the command dispatcher. As described herein, memory operation commands may be dispatched from a command dispatcher when a corresponding command queue notifies the command dispatcher that space is available in the command queue. Using the approach described with respect to FIG. 3, when a command is dispatched, the pointers (next, head and/or tail) for the linked list that corresponds with the respective memory device 250 as updated as appropriate, such as in the fashions described herein.

At block 590, the method 500 includes providing the received memory operation commands from the given command queue 234a-236b to its respective memory device 250 in a first-in-first-out order. In like fashion as dispatching memory operation commands from the command dispatcher 233 to the command queues 234a-236b, the command queues 234a-236b may provide memory operation commands to their respective memory devices 250 when notified by that their respective memory devices 250 that they are ready to receive a memory command for execution.

Figure 6:
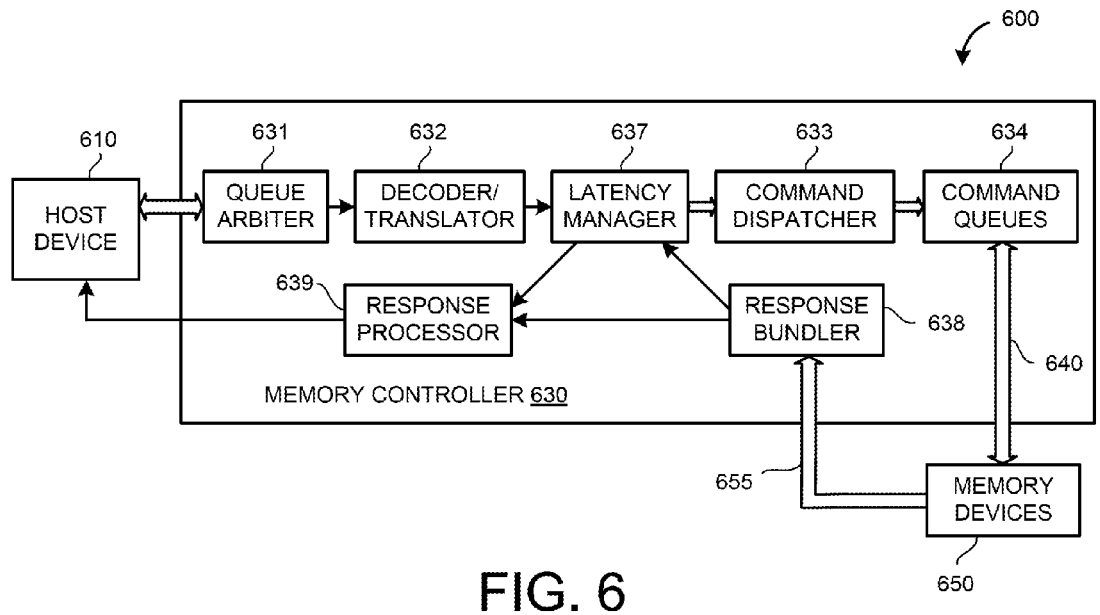
FIG. 6 is a block diagram of yet another computing system in accordance with an example embodiment.

FIG. 6 is a block diagram of a computing system 600 in accordance with yet another example embodiment. The computing system 600 shown in FIG. 6 includes similar elements to the computing system 200 shown in FIG. 2. Like elements of the computing system 600 to those of the computing system 200 are referenced with 600 series reference numerals that correspond with the 200 series reference numerals shown in FIG. 2. For instance, the computing system 600 includes a host device 610, a memory controller 630, a queue arbiter 631, a decoder/translator 632, a command dispatcher 633, command queues 634, a memory device channel interface 640 and memory devices 650, which correspond, respectively, with the host computing device 210, the memory controller 230, the queue arbiter 231, the decoder/translator 232, the command dispatcher 233, command queues 234 (as well as command queues 235 and 236), memory device channel interfaces 240 and memory devices 250. The like elements of FIG. 6, with those of FIG. 2, may operate in substantially similar fashion as the corresponding elements discussed above with respect to FIG. 2. Therefore, for purposes of brevity and clarity, the like elements of FIG. 6 with FIG. 2 indicated above are not described again in detail with respect to FIG. 6.

In addition to the like elements of FIG. 6 with those of FIG. 2, the computing system 600 includes additional elements that may be used to manage command latencies in a data storage device. The additional elements of the computing system 600 are principally in the memory controller 630 and include a latency manager 637, a response bundler 638, a response processor 639 and a memory device response interface 655.

In the computing system 600, the latency manager 637 may be operationally coupled with the command queues 634 (e.g., via the command dispatcher 633). In the computing system 600, rather than memory operation commands being provided to the command dispatcher 633 from the decoder/translator 632 (in like manner as in the computing system 200), memory operation commands may be provided to the command dispatcher 633 by the latency manager 637. The command dispatcher 633 may then process the received memory operation commands in substantially the same fashion as discussed above with respect to FIGS. 2-5.

In the computing system 600, the latency manager 637 may be configured, for each of the plurality of memory devices, to receive, from the host device 610, memory operation commands for execution by the respective memory device. In the computing system 600, the latency manager may receive the memory operation commands via the queue arbiter 631 and the decoder/translator 632 using techniques similar to those for providing memory operation commands to the command dispatcher 233, as discussed above.

As part of managing memory command (e.g., flash memory command) latencies in the computing system 600, the latency manager 637 may be configured to maintain a cumulative latency estimate for each respective memory device of the memory devices 650 (which may be arranged in like fashion as the memory devices 250a-250f shown in FIG. 2). In such an approach, each cumulative latency estimate may indicate an estimated amount of time that currently pending memory operation commands for each respective memory device will take to complete execution. In an example embodiment, currently pending memory operation commands for a given memory device (that are accounted for in the corresponding cumulative latency estimate) include memory operation commands that awaiting execution by the given memory device and memory operation commands that are in the process of being executed by the given memory device.

The latency manager 637 may be further configured, for each memory operation command, when received by the latency manager, to compare the respective cumulative latency estimate for the corresponding memory device with a latency threshold for the received memory operation command. As some examples, read operations may have a latency threshold of approximately 1-2 milliseconds (ms), write operations may have a latency threshold of approximately 5 ms and erase operations may have a latency threshold of 10 ms. It will be appreciated, however, that the specific latency thresholds used will depend on the particular embodiment.

In such an approach, if the cumulative latency estimate is at or below the latency threshold for a received memory operation comment, the latency manager 637 may be configured to provide the received memory operation command to the respective command queue (e.g., via the command dispatcher 633). However, if the cumulative latency estimate is above the latency threshold, the latency manager 637 may be configured to return the received memory operation command to the host device 610 with an indication that the latency threshold was exceeded. Such an approach allows the computing device 600 to have control over the amount of memory command execution latency that is acceptable for any given memory operation command.

As shown in FIG. 6, the response processor 639 may be operatively coupled with the latency manager 637, the response bundler 638 and the host device 610. The response processor 639 may be configured to receive, from the latency manager 637, memory operation commands that are being returned to the host device 610 from the latency manager 637 due to a latency threshold being exceeded by a cumulative latency estimate. The response processor 639 may be further configured to return the memory operation commands received from the latency manager 637 to the host device 610 and, for each returned memory operation command, provide the host device 610 with an indication that a respective latency threshold was exceeded.

In the example embodiment shown in FIG. 6, the response processor 639 may also be configured to receive, from the plurality of memory devices 650 (via the memory device response interface 655 and the response bundler 638), command completion responses, where each command completion response indicates completion of a given memory operation command. The response processor may be further configured to provide the received command completion responses to the latency manager 637. In this example, the latency manager 637 may be further configured to, based on the command completion responses, update the respective cumulative latency estimates, such as using the techniques described herein.

In the computing system 600, the cumulative latency estimate for a given memory device 650 may be a sum of respective execution time estimates for each of the currently pending memory operation commands for the given memory device. In such an approach, the respective individual execution time estimates may be based on one or more factors. For example, the individual execution time estimates may be based on a type of the respective memory operation command, such as whether the command is a flash read, a flash write or a flash erase command. The individual execution time estimates may also be based on a memory address included in the respective memory operation command. Such an approach may be useful in embodiments that use multi-level cell (MLC) flash devices, as some addresses in MLC flash devices take longer to write and/or erase than other addresses. The individual execution time estimates could also be based on a type (e.g., manufacturer) of a given memory device. Such an approach would allow timing specifications for a given memory device to be comprehended in the cumulative latency estimates. Further, the individual execution time estimates for memory operation commands may be based on actual execution times for like commands in the computing system 600. Of course, the individual execution time estimates may be based on a number of other factors.

Figure 10:
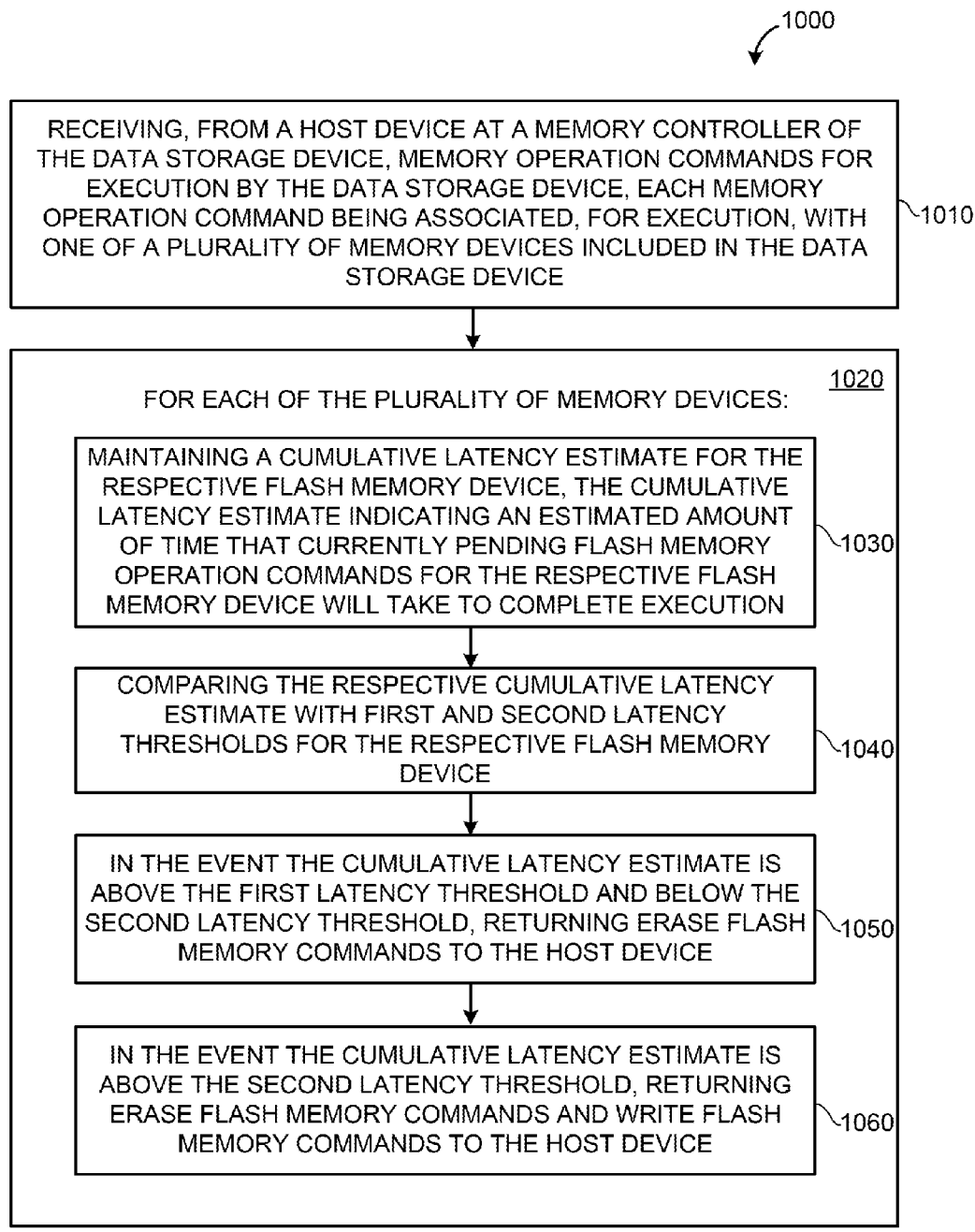
FIG. 10 is a flowchart illustrating another method for managing memory operation command latency in accordance with an example embodiment.

The latency manager 637 may also be configured to manage command latencies on a memory device by memory device basis. A method for implementing such an approach is illustrated in FIG. 10 and discussed in further detail below. Briefly, however, in such an approach, the latency manager 637 may be configured, for each memory device 650, to maintain a cumulative latency estimate for the respective flash memory device. In this example, each cumulative latency estimate, in like fashion as discussed above, indicates an estimated amount of time that currently pending flash memory operation commands for the respective flash memory device will take to complete execution.

In this example, the latency manager 637 may be configured to compare the respective cumulative latency estimate with a first latency threshold for the respective flash memory device. If the cumulative latency estimate is above the first latency threshold, the latency manager 637 may be configured to return flash memory erase commands that are associated with the respective memory device 650 to the host device 610. In an example embodiment, the first threshold may be approximately 5 ms (e.g., on the order of a write operation latency in one embodiment), which would prevent long latency erase operations from being queued for device with latency estimates at or above that threshold.

Further in such an approach, the latency manager may be further configured to compare the respective cumulative latency estimate with a second latency threshold for the respective flash memory device (e.g., where the second latency threshold is greater than the first latency threshold, such as approximately 10 ms, or on the order of an erase operation latency in one embodiment). If the cumulative latency estimate is above the second latency threshold, the latency manager 637 may be configured to return erase flash memory commands and write flash memory commands associated with the respective memory device 650 to the host device 610. Such an approach may allow for flexible control of memory operation command latencies, as the thresholds may be adjustable. Also, such an approach may reduce memory operation execution latencies as it prevents high latency operations (e.g., write and/or erase operations) from being dispatched for execution by memory devices that may already have a significant backlog of memory commands to execute.

Figure 7:
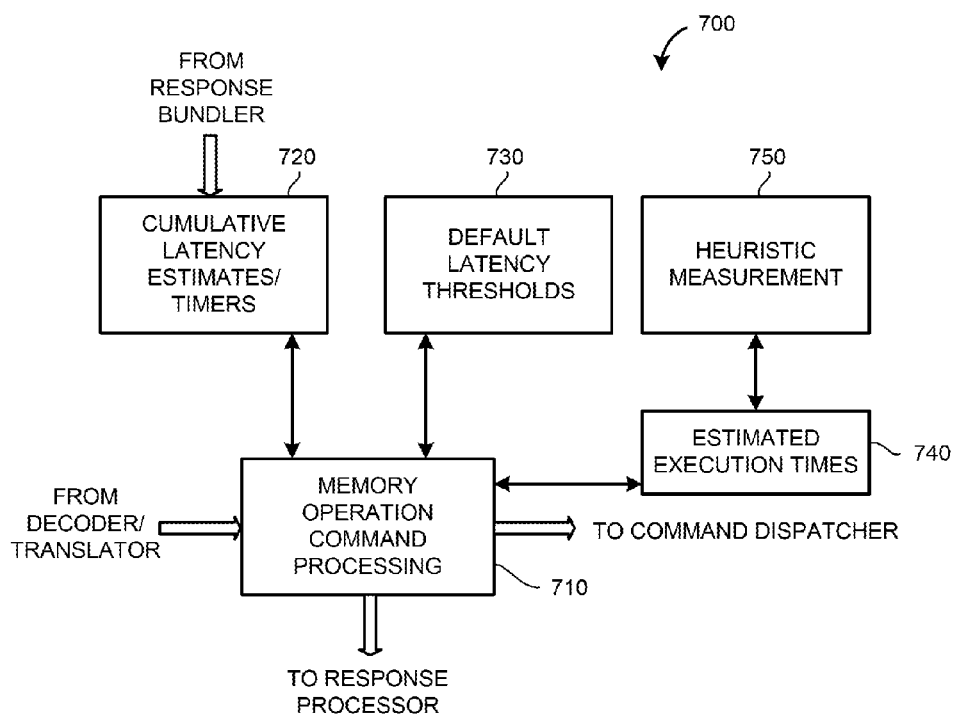
FIG. 7 is a block diagram illustrating a latency manager in accordance with an example embodiment.

FIG. 7 is a block diagram illustrating a latency manager 700 in accordance with an example embodiment. The latency manager 700 may be implemented as the latency manager 637 of FIG. 6. Accordingly, for purposes of illustration, the latency manager 700 will be described with further reference to FIG. 6. It will be appreciated however, that the latency manager 637 of the computing system 600 may be implemented using other arrangements.

As shown in FIG. 7, the latency manager 700 includes memory operation command processing module 710, a cumulative latency estimates/timers module 720, a default latency thresholds table 730, a table of estimated execution times 740 and a heuristic measurement module 750. In the latency manager 700, the memory operation command processing module 710 may receive memory operation commands from the decoder/translator 632 of the computing system 600. The memory operation command processing module 710 may then, using the techniques described herein, make a decision for each received memory operation command (e.g., based on a cumulative latency estimate and one or more latency thresholds), whether to send the memory command to the command dispatcher 633, or to return the command to the host device 610 (e.g., via the response processor 639) due to a latency threshold being exceeded.

In the latency manager 700, cumulative latency estimates, as described herein, may be included in a table or may implemented using a bank of timers (one for each memory device for which a cumulative latency estimate is being tracked) in the cumulative latency estimates/timers module 720. As shown in FIG. 7, the cumulative latency estimates/timers module 720 may be operationally coupled with the response bundler 638 to receive command completion responses and update the cumulative latency estimates based on those command completion responses, such as using the techniques described herein.

Defaults latency thresholds table 730 may be used to store default threshold values for latency thresholds, such as those described herein. The table of estimated execution times 740 may, likewise, be used to store estimated execution times for memory operation commands. As shown in FIG. 7, the table of estimated execution times 740 may be operatively coupled with the heuristics measurement module 750. In such an approach, the heuristics measurement module 750 may be configured to gather heuristic information regarding execution of memory commands, such as actual execution times for different memory commands, different addresses, different memory devices, etc. The heuristic measurement module 750 may also be configured to use the heuristic information it gathers to modify the table of estimated execution times 740, so that the accuracy of the estimated execution times may be increased.

Figure 8:
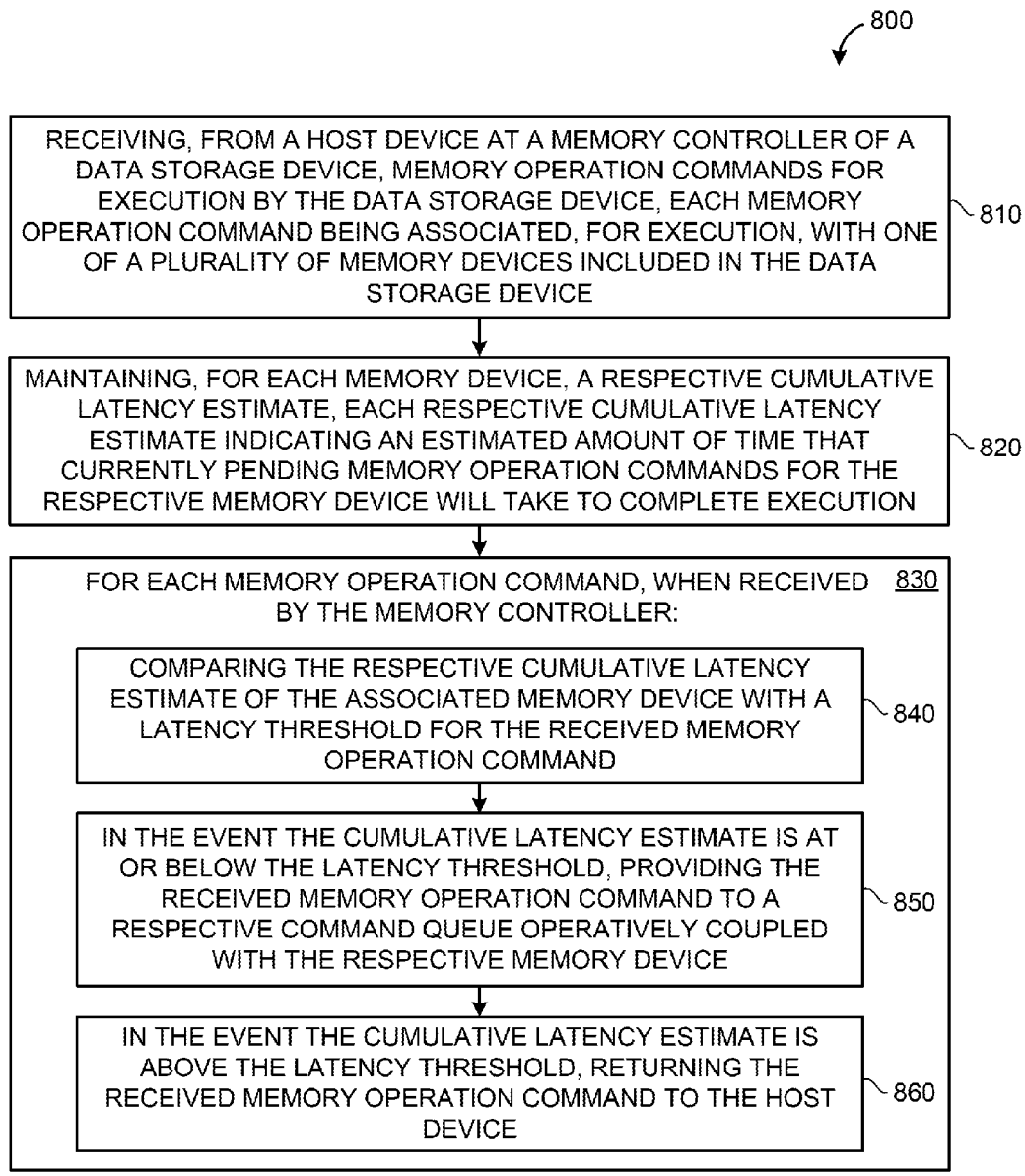
FIG. 8 is a flowchart illustrating a method for managing memory operation command latency in accordance with an example embodiment.

FIG. 8 is a flowchart illustrating a method 800 for managing memory operation command latency in accordance with an example embodiment. The method 800 may be implemented using the apparatus shown in FIGS. 6 and 7. Accordingly, for purposes of illustration, the method 600 will be described with further reference to FIGS. 6 and 7, as appropriate. It will be appreciated, however, that the method 600 may be implemented using other appropriate apparatus and techniques. Additionally, the method 600 may be implemented in conjunction with the techniques described above with respect to FIGS. 1-5. However, for purposes of brevity and clarity, the details of those techniques are not described again in detail with respect to FIG. 8.

When implemented using the computing system 600 shown in FIG. 6 (and the latency manager 700 shown in FIG. 7), the method 800 includes, at block 810, receiving, from the host device 610 at the memory controller 630, memory operation commands for execution by the memory devices 650 (e.g., by the memory devices of a data storage device). In like fashion as previously described, each memory operation command may be associated with one of a plurality of memory devices 650 included in the data storage device and a corresponding command queue 634.

The method 800 also includes, at block 820, maintaining (e.g., in the latency manager 637 or 700), for each memory device 650, a respective cumulative latency estimate. In the method 800, each respective cumulative latency estimate may indicate an estimated amount of time that currently pending memory operation commands for the respective memory device will take to complete execution. In like fashion as described above, pending memory operation commands may include commands that are awaiting execution, as well as memory operation commands that are currently being executed by the memory devices 650. As discussed with respect to FIG. 7, the cumulative latency estimates may be implemented in a table or, alternatively, may be implemented using a plurality of timers, where each cumulative latency timer corresponds with a respective memory device 650.

As illustrated in FIG. 8, the method 800 includes, at block 830, operations 840-860, which may be performed for each for each memory operation command when received by the memory controller (e.g., by the latency manager 637 or 700). At block 840, the method 800 includes comparing the respective cumulative latency estimate for the memory device 650 associated with the memory operation command with a latency threshold for the received memory operation command. The latency threshold for a given memory operation command may be a default latency threshold or may be a latency threshold that is included in the memory operation command, such as in the fashions described herein.

At block 850, in the event the cumulative latency estimate is at or below the latency threshold, the method 800 includes providing the received memory operation command to a respective command queue 634 that is operatively coupled with the respective memory device 650. The memory operations may be provided to the command queues 634 using the command dispatcher 633 using the techniques described herein, such as with respect to FIGS. 2-5.

At block 860, in the event the cumulative latency estimate is above the latency threshold, the method 800 includes returning the received memory operation command to the host device 610, e.g., via the response processor 630. The response processor 639, for each returned memory operation command, may provide the host device 610 with an indication that the latency threshold for the command was exceeded. In response to this indication, the host device 610 may perform a number of actions, such as retrying the command, obtaining data from an alternative location or aborting the command, as some examples. Such an approach may prevent memory operation commands from timing out, as well as providing predictable memory operation command execution times.

Figure 9A:
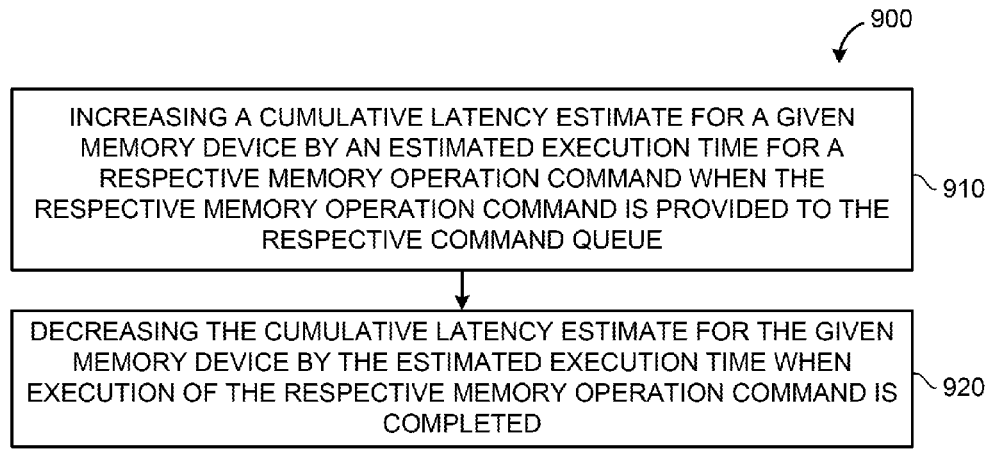
FIGS. 9A and 9B are flowcharts illustrating methods for maintaining a cumulative latency estimate in accordance with example embodiments.
Figure 9B:
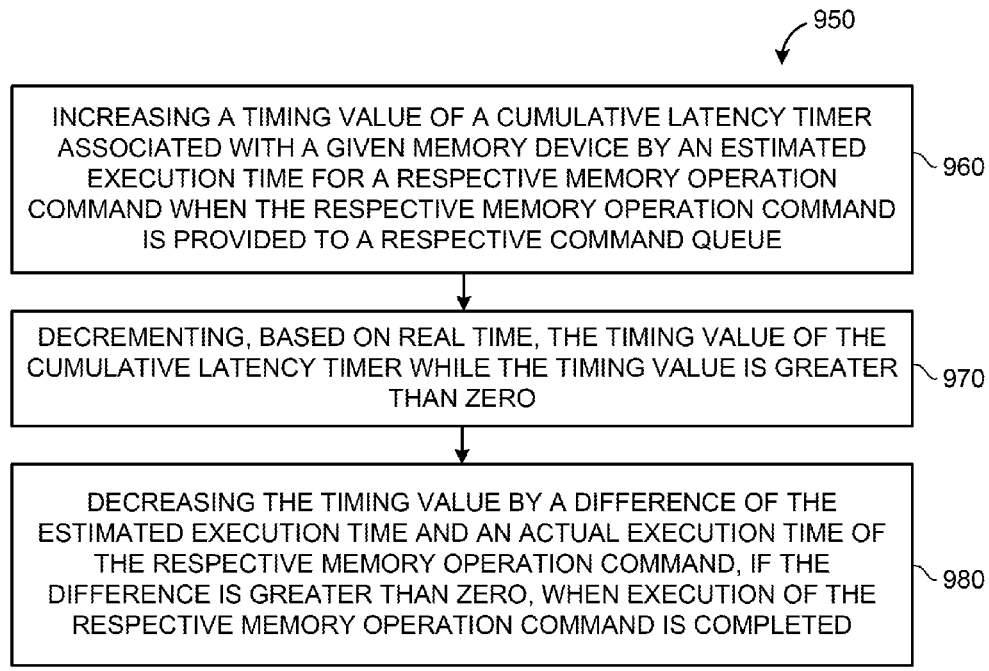

FIGS. 9A and 9B are flowcharts illustrating methods 900 and 950 for maintaining a cumulative latency estimate for a given memory device in accordance with example embodiments. The methods 900 and 950 may be implemented at block 820 of the method 800 shown in FIG. 8. In these examples, the operations of the method 900 and 950 may be implemented for each memory operation command that is provided to a given memory device's command queue.

It will be appreciated that the methods 900 and 950 may be applied for each of the memory devices (and associated command queues) in a data storage device, such as in the embodiments described herein. Further, the methods 900 and 950 may be implemented in conjunction with one another, such as by using the method 900 for maintaining cumulative latency estimates for some memory devices, while using the method 950 to maintain cumulative latency estimates for other memory devices. In similar fashion, other approaches for maintaining a cumulative latency estimate may be implemented in conjunction with the methods 900 and 950, or in place of the methods 900 and 950.

In like fashion as the method 800, the methods 900 and 950 may be implemented using the apparatus shown in FIGS. 6 and 7. Accordingly, for purposes of illustration, the methods 900 and 950 will be described with further reference to FIGS. 6 and 7, as appropriate. It will be appreciated, however, that the methods 900 and 950 may be implemented using other appropriate apparatus and techniques. Additionally, the method 900 may be implemented in conjunction with the techniques described above with respect to FIGS. 1-5. However, for purposes of brevity and clarity, the details of those techniques are not described again in detail with respect to FIGS. 9A and 9B.

At block 910, the method 900 for maintaining a cumulative latency estimate includes (for each memory operation provided to a given memory device's command queue), increasing the cumulative latency estimate for the given memory device by an estimated execution time 740 for the respective memory operation command. At block 910, the cumulative latency estimate is increased when the respective memory operation command is provided to the respective command queue 634. In other embodiments, the cumulative latency estimate may be increased by a received memory command's estimated execution time 740 when the memory command is received at the latency manager 637/700. In such an approach, if the memory command is returned to the host because the latency threshold is increased, the cumulative latency estimate may then be decreased by the estimated execution time of the returned command, as the command will not be pending in the data storage device and its estimated execution time should, therefore, not be included in the corresponding memory device's cumulative latency estimate.

At block 930, the method 900 further includes decreasing the cumulative latency estimate for the given memory device by the estimated execution time when execution of the respective memory operation command is completed. In such an approach, the response bundler 638 may notify the latency manager 637/700 when commands are completed. The latency manager 635/700, in response to these notifications, may update the cumulative latency estimates by decreasing the respective estimates by the corresponding estimated execution times for the completed commands.

Referring now to FIG. 9B, at block 960, the method 950 includes (for each memory operation command provided to a given memory device's command queue), increasing a timing value of a cumulative latency timer 720 associated with the given memory device by an estimated execution time for the respective memory operation command. In similar fashion as the operation at block 910 of the method 900, the cumulative latency timer 720 associated with the given memory device 650 is increased when the respective memory operation command is provided to the respective command queue 634. In other embodiments, the cumulative latency timer value may be increased when the command is received at the latency manager 637/700. If the command is returned due to its latency threshold being exceeded, the cumulative latency timer value may then be decreased by the estimated execution time of the returned command, as the command will not be pending in the data storage device and its estimated execution time should not be included in the cumulative latency timer value.

The method 950 further includes, at block 970, decrementing the timing value of the cumulative latency tinier 720 while the timing value is greater than zero. In the method 950, the cumulative latency timer may be decremented based on a real time clock. In the method 950, the cumulative latency timers 720 may stop decrementing when their timer value reaches zero, even if the corresponding memory operation command has not yet completed execution. Such a situation may occur if a memory operation command takes longer to execute than its estimated execution time. In this situation, stopping the timer from decrementing after it reaches zero would prevent the timer from rolling over, which could result in a negative timer value, or an extremely large and inaccurate timer value. These situations may cause incorrect latency threshold determinations and, as a result, cause memory commands to be improperly returned to the host device 610. In other embodiments, count-up timers may be used, where estimated execution times are used to calculate timeout values. In such an approach, the count-up timers may be continually incremented and corresponding latency estimates may be determined by subtracting a current time from the timeout value.

Also, the timeout value may be decremented when a command completes, where the timer is decremented by the difference between the estimated execution time for the completed command minus the actual execution time, if the difference is greater than zero.

At block 980, the method 950 includes, in response to the respective memory operation completing, decreasing the timing value of the cumulative latency timer that was increased at block 960. At block 980, the cumulative latency timer value may be decreased by a value that is equal to a difference of the estimated execution time and an actual execution time of the respective memory operation command, if that difference is greater than zero. Such an approach accounts for differences in the estimated execution time and the actual execution time without attempting to decrease the timer value to a value below zero.

FIG. 10 is a flowchart illustrating another method 1000 for managing memory operation command latency in accordance with an example embodiment. As with the method 800, the method 1000 may be implemented using the apparatus shown in FIGS. 6 and 7. Accordingly, for purposes of illustration, the method 1000 will be described with further reference to FIGS. 6 and 7, as appropriate. It will be appreciated, however, that the method 1000 may be implemented using other appropriate apparatus and techniques. Additionally, the method 1000 may be implemented in conjunction with the techniques described above with respect to FIGS. 1-5. However, for purposes of brevity and clarity, the details of those techniques are not described again in detail with respect to FIG. 10.

The method 1000 includes, at block 1010, receiving, from the host device 610 at the memory controller 630 of a data storage device, memory operation commands for execution by the data storage device. In the method 1000, each memory operation command is associated (for execution) with one of a plurality of memory devices included in the data storage device.

In the method 1000, block 1020 includes operations 1030-1060, which may be performed for each of the plurality of memory devices of a data storage device, such as, for example, the memory devices 650 (which may be arranged in like fashion as the memory devices 250a-250f shown in FIG. 2). At block 1030, the method 1000 includes, for each of the plurality of memory devices, maintaining a cumulative latency estimate for the respective flash memory device. At block 1030, the cumulative latency estimate may indicate an estimated amount of time that currently pending flash memory operation commands for the respective flash memory device will take to complete execution. At block 1040, the method 1000 includes comparing the respective cumulative latency estimate with a first latency threshold and a second latency threshold for the respective flash memory device. In this example, the first latency threshold is less than then second latency threshold.

At block 1050, if the cumulative latency estimate (based on the comparison at block 1040) is above the first latency threshold, the method 1000 includes returning erase flash memory commands to the host device 610. As flash erase operations may take significantly longer to execute than other flash operations, the method 1000 may be used to return erase operations to the host device 610 when the lower (first) latency threshold is exceeded in order to manage memory operation command latency. For instance, such an approach prevents adding high latency erase commands to the pending memory commands for memory devices that already have a significant execution time backlog.

Similarly, at block 1060, if the cumulative latency estimate is above the second latency threshold, the method 1000 includes returning erase flash memory commands and write flash memory commands to the host device. As flash write operations may take significantly longer to execute than flash read operations (but less time than erase operations), the method 1000 may be used to return erase operations and write operations to the host device 610 when the higher (second) latency threshold is exceeded in order to manage memory operation command latency. For instance, such an approach prevents adding high latency erase and write commands to the pending memory commands for memory devices that already have a significant execution time backlog. It will be appreciated that execution times (estimated and/or actual execution times) for such commands may vary. Accordingly, the latency thresholds used may depend on the execution times for a given embodiment.

In the method 1000, the use of separate thresholds allows for flexibility in managing the cumulative latencies for memory devices of a data storage device. In other embodiments, a third latency threshold could be used, where the third latency threshold is greater than the second latency threshold. In such an approach, if the cumulative latency estimate for a given memory device exceeds its third latency threshold, the latency manager 637/700 may be configured to return all flash memory operations to the host device, so as to prevent further backlogging memory devices that already have a significant execution time backlog. Such an approach may also allow for better control over read operation latencies, as a read operation will not get queued for execution when the memory device associated with the read operation already has a cumulative estimated execution time latency backlog above a specific threshold. In other embodiments, additional thresholds could be used for other types of commands, in like fashion as the approaches described herein. For example, in certain embodiments, an additional threshold could be used for copy commands.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. Accordingly, other embodiments are within the scope of the following claims.

What is claimed is:

1. A memory controller for controlling operation of a data storage device, the memory controller comprising:
   a queue arbiter configured to obtain, from a host device, memory operation commands for execution by the data storage device;
   a command dispatcher operationally coupled with the queue arbiter, the command dispatcher being configured to:
      receive the memory operation commands from the queue arbiter in a same order as obtained by the queue arbiter from the host device;
      separately and respectively queue the memory operation commands for each of a plurality of memory devices; and
      dispatch the memory operation commands for execution by the plurality of memory devices;
   a plurality of command queues operationally coupled with the command dispatcher, each command queue being associated with a respective one of the plurality of memory devices and configured to:
      receive the dispatched memory operation commands corresponding with its respective memory device from the command dispatcher in a same order as received by the command dispatcher; and
      provide the received memory operation commands to its respective memory device in a first-in-first-out order.

2. The memory controller of claim 1, further comprising a decoder configured to respectively determine which of the plurality of memory devices corresponds with each of the memory operation commands.

3. The memory controller of claim 2, wherein respectively determining which of the plurality of memory devices corresponds with each of the memory operation commands comprises performing address translation on a respective memory address included in each of the memory operation commands.

4. The memory controller of claim 1, wherein the host device comprises one of a personal computer, a laptop computer, a server, a tablet computer and a netbook computer.

5. The memory controller of claim 1, wherein the memory operation commands comprise one or more of flash memory read operations, flash memory write operations and flash memory erase operations.

6. The memory controller of claim 1, wherein the queue arbiter is further configured to obtain the memory operation commands from the host device based on a work schedule for a plurality of memory partitions implemented in the data storage device.

7. The memory controller of claim 6, wherein:
   the command dispatcher comprises a unified command buffer including a plurality of memory operation command slots; and
   the work schedule is based on respective allocations of the plurality of memory operation command slots to each of the plurality of memory partitions.

8. The memory controller of claim 7, wherein the queue arbiter is further configured, for each memory partition, to obtain memory operation commands based on availability of allocated memory operation command slots for the respective memory partition.

9. The memory controller of claim 7, wherein the respective allocations comprise guaranteed memory operation command slot allocations for each of the plurality of memory partitions.

10. The memory controller of claim 7, wherein the command dispatcher is configured to provide for oversubscription of the memory operation command slots such that a number of the memory operation command slots corresponding with the oversubscription are shared by the plurality of memory partitions.

11. The memory controller of claim 6, wherein the queue arbiter is further configured, for a given memory partition, to obtain memory operation commands for the given memory partition from one or more partition queues on the host device that correspond with the given memory partition.

12. The memory controller of claim 11, wherein the queue arbiter is still further configured to obtain memory operation commands for memory partitions having a plurality of corresponding partition queues in the host device in accordance with respective priorities for each queue of the respective plurality of partition queues.

13. The memory controller of claim 6, wherein the work schedule is based on respective priorities of each of the memory partitions.

14. The memory controller of claim 6, wherein each command queue of the plurality of command queues is associated with a single one of the memory partitions.

15. The memory controller of claim 1, wherein the command dispatcher is configured to separately and respectively queue memory operation commands by maintaining, for each of the plurality of memory devices, a respective linked list of corresponding memory operation commands in the command dispatcher.

16. The memory controller of claim 1, wherein the command dispatcher is further configured, for each command queue, to dispatch respective memory operations based on availability of queue slots in the respective command queue.

17. A method comprising:
obtaining, from a host device by a queue arbiter of a memory controller, memory operation commands for execution by a data storage device;
receiving, by a command dispatcher of the memory controller, the memory operation commands from the queue arbiter in a same order as obtained by the queue arbiter from the host device;
separately and respectively queuing, in the command dispatcher, the memory operation commands for each of a plurality of memory devices;
dispatching, by the command dispatcher, the memory operation commands for execution by the plurality of memory devices;
receiving, by a plurality of command queues, the dispatched memory operation commands, wherein each command queue of the plurality of command queues is associated with a respective one of the plurality of memory devices and is configured to:
  receive the dispatched memory operation commands corresponding with its respective memory device from the command dispatcher in a same order as received by the command dispatcher; and
  provide the received memory operation commands to its respective memory device in a first-in-first-out order.

18. The method of claim 17, further comprising, respectively determining which of the plurality of memory devices corresponds with each of the memory operation commands by performing address translation on a respective memory address included in each of the memory operation commands.

19. A system comprising:
a host device comprising a plurality of host memory operation queues; and
a data storage device operationally coupled with the host device, the data storage device comprising:
  a plurality of flash memory devices;
  a memory controller operationally coupled with the plurality of flash memory devices, the memory controller comprising:
    a queue arbiter configured to obtain, from the host memory operation queues, memory operation commands for execution by the data storage device;
    a command dispatcher operationally coupled with the queue arbiter, the command dispatcher being configured to:
      receive the memory operation commands from the queue arbiter in a same order as obtained by the queue arbiter from the host device;
      separately and respectively queue the memory operation commands for each of the plurality of flash memory devices; and
      dispatch the memory operation commands for execution by the plurality of flash memory devices;
    a plurality of memory device command queues operationally coupled with the command dispatcher, each memory device command queue being associated with a respective one of the plurality of flash memory devices and configured to:
      receive the dispatched memory operation commands corresponding with its respective memory device from the command dispatcher in a same order as received by the command dispatcher; and
      provide the received memory operation commands to its respective flash memory device in a first-in-first-out order.

20. The system of claim 19, wherein:
the data storage device implements a plurality of memory partitions; and
each of the host memory operation queues is associated with a single memory partition of the plurality of memory partitions.

21. The system of claim 20, wherein the queue arbiter is further configured to obtain memory operation commands from the host device, for each memory partition, based on respective priorities of the host memory operation queues of the respective memory partition.

22. The system of claim 19, wherein:
the data storage device implements a plurality of memory partitions; and
each of the flash memory devices is associated with a single memory partition of the plurality of memory partitions.

* * * * *

UNITED STATES PATENT AND TRADEMARK OFFICE
CERTIFICATE OF CORRECTION

PATENT NO.        : 8,255,618 B1                          Page 1 of 1
APPLICATION NO.   : 13/267613
DATED             : August 28, 2012
INVENTOR(S)       : Albert T. Borchers et al.

It is certified that error appears in the above-identified patent and that said Letters Patent is hereby corrected as shown below:

Title page, Item (75), in "Inventors", in column 1, line 3, delete "Andrews" and insert -- Andrew --, therefor.

Signed and Sealed this
Eleventh Day of December, 2012

David J. Kappos
*Director of the United States Patent and Trademark Office*